US010769337B2

(12) United States Patent
Zhao et al.

(10) Patent No.: US 10,769,337 B2
(45) Date of Patent: Sep. 8, 2020

(54) IGBT MODELING METHOD AND CIRCUIT SIMULATION METHOD

(71) Applicant: TSINGHUA UNIVERSITY, Beijing (CN)

(72) Inventors: Zhengming Zhao, Beijing (CN); Ye Jiang, Beijing (CN); Tian Tan, Beijing (CN); Boyang Li, Beijing (CN); Yatao Ling, Beijing (CN); Bochen Shi, Beijing (CN); Liqiang Yuan, Beijing (CN); Kainan Chen, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 312 days.

(21) Appl. No.: 15/807,977

(22) Filed: Nov. 9, 2017

(65) Prior Publication Data
US 2018/0276327 A1    Sep. 27, 2018

(30) Foreign Application Priority Data
Mar. 24, 2017    (CN) .......................... 2017 1 0182414

(51) Int. Cl.
G06F 30/367    (2020.01)
G06F 111/10    (2020.01)

(52) U.S. Cl.
CPC ........ *G06F 30/367* (2020.01); *G06F 2111/10* (2020.01)

(58) Field of Classification Search
CPC ..................... G06F 17/5036; G06F 2217/16

USPC .......................................................... 703/14
See application file for complete search history.

(56) References Cited

U.S. PATENT DOCUMENTS

| 4,894,568 A | * | 1/1990 | Pavlin | ............... | H03K 17/04123 327/434 |
| 5,808,504 A | * | 9/1998 | Chikai | ............... | H03K 17/0406 327/434 |
| 5,877,646 A | * | 3/1999 | Jorg | .................. | H03K 17/08128 327/374 |

(Continued)

OTHER PUBLICATIONS

Xue et al. ("Modeling Inductive Switching Characteristics of High-Speed Buffer Layer IGBT", IEEE 2016, pp. 3075-3087) (Year: 2016).*

(Continued)

*Primary Examiner* — Iftekhar A Khan
(74) *Attorney, Agent, or Firm* — Hauptman Ham, LLP

(57) ABSTRACT

An IGBT modeling method includes creating piece-wise line functions describing a collector-emitter voltage $v_{ce}$, a collector current $i_c$ and a gate-emitter voltage $v_{ge}$ of the IGBT during a switching-on transient based on an internal structure of the IGBT and transient processes of the IGBT. The IGBT modeling method further includes creating piece-wise line functions describing the collector-emitter voltage $v_{ce}$, the collector current $i_c$ and the gate-emitter voltage $v_{ge}$ of the IGBT during a switching-off transient based on the internal structure of the IGBT and the transient processes.

12 Claims, 3 Drawing Sheets

(56) References Cited

U.S. PATENT DOCUMENTS

| | | | | |
|---|---|---|---|---|
| 6,111,453 A * | 8/2000 | Uchida | H03K 17/0828 | 327/379 |
| 6,127,746 A * | 10/2000 | Clemente | G01R 19/12 | 307/131 |
| 6,271,709 B1 * | 8/2001 | Kimura | H03K 17/168 | 327/170 |
| 6,285,235 B1 * | 9/2001 | Ichikawa | H03K 17/0406 | 326/17 |
| 6,469,916 B1 * | 10/2002 | Kerkman | H02M 7/53873 | 318/811 |
| 6,972,611 B1 * | 12/2005 | Thalheim | H03K 17/168 | 327/380 |
| 8,099,270 B2 * | 1/2012 | Pawlikiewicz | G06F 30/367 | 703/14 |
| 9,455,697 B2 * | 9/2016 | Norling | H03K 17/102 | |
| 9,793,352 B1 * | 10/2017 | Seok | H01L 29/1095 | |
| 9,984,190 B1 * | 5/2018 | Aurich | G06F 30/367 | |
| 10,071,652 B2 * | 9/2018 | Lu | B60L 50/51 | |
| 10,389,345 B2 * | 8/2019 | Ziemba | H03K 17/0406 | |
| 10,461,732 B1 * | 10/2019 | Norling | H03K 17/166 | |
| 2002/0183990 A1 * | 12/2002 | Wasynczuk | G06F 30/367 | 703/2 |
| 2003/0001522 A1 * | 1/2003 | Newman, Jr. | H05B 41/28 | 315/291 |
| 2003/0015989 A1 * | 1/2003 | Walters | H02P 21/34 | 318/727 |
| 2007/0096167 A1 * | 5/2007 | Francis | H01L 29/7397 | 257/262 |
| 2012/0098097 A1 * | 4/2012 | Felsl | H01L 29/7395 | 257/566 |
| 2012/0161852 A1 * | 6/2012 | Curbelo | H03K 17/0828 | 327/513 |
| 2012/0280728 A1 * | 11/2012 | Hussein | H03K 17/168 | 327/155 |
| 2013/0039099 A1 * | 2/2013 | Wu | H02M 7/53871 | 363/40 |
| 2013/0063185 A1 * | 3/2013 | Ye | H02M 3/33538 | 327/108 |
| 2013/0083576 A1 * | 4/2013 | Gan | H03K 17/168 | 363/123 |
| 2013/0175575 A1 * | 7/2013 | Ziemba | H03K 17/567 | 257/140 |
| 2014/0319576 A1 * | 10/2014 | Kobayashi | H01L 29/42368 | 257/138 |
| 2015/0349761 A1 * | 12/2015 | Feng | H02M 7/003 | 327/309 |
| 2016/0142048 A1 * | 5/2016 | Zoels | H03K 17/0812 | 327/109 |
| 2016/0284824 A1 * | 9/2016 | Nagata | H01L 23/535 | |
| 2016/0314230 A1 * | 10/2016 | Dufour | G06F 30/30 | |
| 2017/0132337 A1 * | 5/2017 | Li | G06F 30/331 | |
| 2017/0206297 A1 * | 7/2017 | Meyer | H03K 4/06 | |
| 2017/0242949 A1 * | 8/2017 | Schindler | H01L 29/0634 | |
| 2017/0350934 A1 * | 12/2017 | Sathik | G01R 31/2617 | |
| 2018/0013346 A1 * | 1/2018 | Westmoreland | H02M 1/42 | |
| 2018/0019131 A1 * | 1/2018 | Suzuki | H01L 21/283 | |

OTHER PUBLICATIONS

Zhang et al. ("Piecewise Linear Modeling of Nonlinear devices for Formal Verification of Analog Circuits", FMCAD 2012, pp. 196-203) (Year: 2012).*

Lotfi et al. ("Modeling of the New Transient Behavioral Spice Model of IGBTs Including Temperature Effect", International Journal of Hybrid Information Technology vol. 9, No. 1 (2016), pp. 141-152) (Year: 2016).*

Qian et al. ("Turn-off Switching Loss Model and Analysis of IGBT under Different Switching Operation Modes", IEEE, 1995, pp. 240-245) (Year: 1995).*

Jin et al. ("Power Converter EMI Analysis Including IGBT Nonlinear Switching Transient Model",2006, IEEE, pp. 1577-1583) (Year: 2006).*

Henrik Hollander ("Modeling of an IGBT and a Gate Unit", 2013, Royal Institute of Technology, pp. 1-57) (Year: 2013).*

Qi et al. ("Characterization of IGBT Modules for System EMI Simulation", IEEE, 2010, pp. 2220-2225) (Year: 2010).*

Kang et al. ("A Parameter Extraction Algorithm for an IGBT Behavioral Model", IEEE, 2004, pp. 1365-1371) (Year: 2004).*

Asparuhova et al. ("IGBT Spice Behavioral Model Using the Hammerstein", Electronics 2005, pp. 1-6) (Year: 2005).*

Office Action dated Oct. 31, 2019 and English translation from corresponding application No. CN 201710182414.4.

Search Report dated Oct. 14, 2019 from corresponding application No. CN 201710182414.4.

Notification to Grant Patent Right for Invention dated Mar. 5, 2020 and English translation from corresponding application No. CN 201710182414.4.

* cited by examiner

IGBT MODELING METHOD AND CIRCUIT SIMULATION METHOD

FIELD

Embodiments of the present invention relate to the field of power semiconductor devices, and more specifically, to an IGBT (Insulated Gate Bipolar Transistor) modeling method and a circuit simulation method.

BACKGROUND

Insulated Gate Bipolar Transistors (IGBTs) are currently the most widely used active switching devices in power electronics converters. Therefore, a variety of researches have been conducted on the modeling of IGBT. The current IGBT models are mainly divided into two categories from the users' point of view, namely analytical models and behavioral models.

Analytical models are established mainly based on the principles of semiconductor physics, according to the internal structure and the carrier transport of the IGBT. The analytical models can simulate both the steady-state and transient characteristics of IGBTs accurately. The conventional analytical models include Hefner model, Kuang Sheng model, Kraus model, etc. Although the analytical models are accurate, the models suffer for complicated circuit simulations due to complex structures, difficult parameter extractions, large amount of computation and difficulties in convergence.

Behavioral models ignore some internal physical mechanisms of IGBTs, and are more focused on fitting the external characteristics of the devices. The behavioral models can be applied in circuit simulations and can be more accurate than the ideal switch model. As compared to the analytical models, behavioral models are simpler but less accurate, and are less adaptable to different working conditions. Parameter extraction of behavioral models is still complicated, since the parameters have to be extracted from experiment results.

SUMMARY

Embodiments of the present invention aim to help overcome the drawbacks of inaccurate transient characteristics and reliance of parameter extraction on experiment results of the conventional models of IGBT.

At least one aspect of embodiments of the present invention is an IGBT modeling method. The IGBT modeling method includes creating piece-wise line functions to describe a collector-emitter voltage $v_{ce}$, a collector current $i_c$ and a gate-emitter voltage $v_{ge}$ of the IGBT during a switching-on transient and a switching-off transient based on an internal structure of the IGBT and transient processes of the IGBT.

In at least one embodiment, in the IGBT modeling method, the creating of the piece-wise line functions to describe the collector-emitter voltage $v_{ce}$, the collector current $i_c$ and the gate-emitter voltage $v_{ge}$ of the IGBT during the switching-on transient and the switching-off transient includes determining various periods during the switching-on transient and the switching-off transient of the IGBT.

The switching-on transient, which is after a turn-on signal and before a steady on-state, is divided into four periods: a first period starts when a gate drive sends the turn-on signal and ends when $i_c$ begins to rise, a second period starts when $i_c$ begins to rise from 0 and ends when $i_c$ reaches a maximum value, a third period starts when $i_c$ reaches the maximum value and ends when $i_c$ falls back to a load current, and a fourth period ends when $v_{ce}$ falls back to a saturation voltage.

The switching-off transient, which is after a turn-off signal and before a steady off-state, is divided into four periods: a first period starts when the gate drive sends the turn-off signal and ends when $v_{ce}$ begins to rise, a second period starts when $v_{ce}$ begins to rise from the saturation voltage and ends when $v_{ce}$ reaches a DC bus voltage, a third period starts when $i_c$ begins to fall from the load current and ends when $i_c$ falls to a tail current initial value, and a fourth period ends when $i_c$ falls to 0.

The creating of the piece-wise line functions to describe the collector-emitter voltage $v_{ce}$, the collector current $i_c$ and the gate-emitter voltage $v_{ge}$ of the IGBT during the switching-on transient and the switching-off transient includes determining starting values and ending values of the collector-emitter voltage $v_{ce}$, the collector current $i_c$ and the gate-emitter voltage $v_{ge}$ during the four periods of the switching-on transient and the switching-off transient and the duration of the various periods based on the transient processes of the IGBT, and determining the collector-emitter voltage $v_{ce}$, the collector current $i_c$ and the gate-emitter voltage $v_{ge}$ during the various periods in the form of linear function or exponential function.

In at least one embodiment, in the IGBT modeling method, all the parameters used in the creating of piece-wise line functions are obtained from datasheets of the IGBT.

At least one aspect of embodiments of the present invention includes a circuit simulation method, in which an IGBT piece-wise line model is used to describe the characteristics of a commutation loop. The method includes forming a two-port network based on an IGBT, a commutation diode and stray inductance in a commutation loop. Voltages and currents of input and output ports of the two-port network are determined according to the direction of the output current. If the output current flows out of the two-port network, the voltage of the input port equals to a DC bus voltage $V_{DC}$ and the current of the input port equals to the collector current $i_c$, while the current of the output port equals to a load current $I_L$ and the voltage of the output port equals to $V_{DC}$-$v_{ce}$, $v_{ce}$ is a collector-emitter voltage. If the output current flows into the two-port network, the voltage of the input port equals to the DC bus voltage $V_{DC}$ and the current of the input port equals to $i_c$-$I_L$, while the current of the output port equals to the load current $I_L$ and the voltage of the output port equals to the collector-emitter voltage $v_{ce}$.

The circuit simulation method further includes obtaining a relationship between ($v_{ce}$, $i_c$) and ($V_{DC}$, $I_L$, sw) in each period during a switching-on transient and a switching-off transient according to the above-mentioned IGBT modeling method, wherein sw represents an IGBT switching signal.

The circuit simulation method further includes adding the two-port network in its entirety to a simulation circuit for computation.

At least one aspect of embodiments of the present invention includes a computer readable storage medium, having stored thereon program codes which can be executed by one or more processors to perform the above-mentioned circuit simulation method.

Embodiments of the present invention have at least one of the following features.

Based on a typical IGBT internal structure (e.g., planar NPT IGBT) and the transient processes of the IGBT, and under certain simplification assumptions, a piece-wise line model is created to describe the collector-emitter voltage $v_{ce}$ and collector current $i_c$ of IGBT during switching-on and switching-off transients.

The piece-wise line model can accurately represent the important transient characteristics of the IGBT including the delay time, turn-on rise time, turn-off fall time, peak voltage, peak current, etc.

All the parameters of the model can be obtained from datasheets.

The model can be implemented conveniently in circuit simulation. There is no need to model the commutation diode in the commutation loop.

BRIEF DESCRIPTION OF THE DRAWINGS

The above and other features and advantages of the present invention can be better understood from the detailed description of the preferred embodiments in conjunction with the drawings, wherein.

DETAILED DESCRIPTION

Embodiments of the present invention will be described in detail in conjunction with the accompanying drawings. These embodiments are only illustrative and for explaining the present invention, but shall not be considered as a limitation thereto. In the figures, the same or similar reference numbers denote the same or similar elements.

At least one embodiment of the present invention includes an IGBT modeling method, which creates a piece-wise line model of IGBT working in hard switching mode suitable for circuit simulation. Based on an internal structure of a typical IGBT (e.g., planar NPT IGBT) and its transient processes, and under certain simplification assumptions, the modeling method uses piece-wise lines to describe the gate-emitter voltage $v_{ge}$, the collector-emitter voltage $v_{ce}$ and the collector current $i_c$ of IGBT during a switching-on transient and a switching-off transient. The piece-wise line model created by the proposed modeling method can represent the critical transient characteristics of the IGBT devices, and all parameters of the model can be obtained from datasheets.

Specifically, the modeling method includes determining various periods during the switching-on transient and the switching-off transient of the IGBT.

Figure 1:
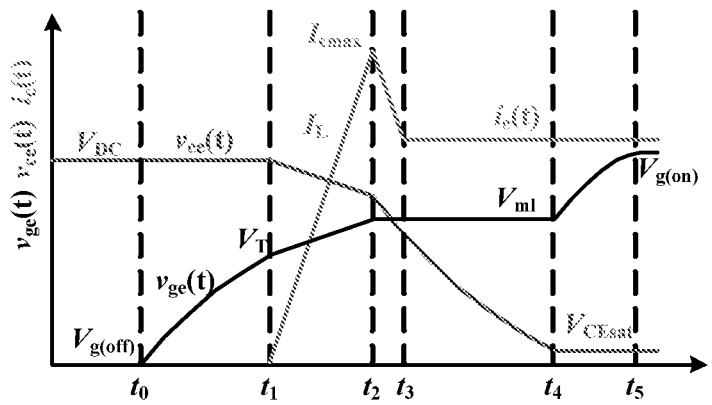
FIG. 1 is a piece-wise line model of IGBT during the switching-on transient according to at least one embodiment of the present invention.

In FIG. 1, the switching-on transient, which is after a turn-on signal and before a steady on-state, is divided into four periods. The first period $[t_0\text{-}t_1]$ starts when the gate drive sends the turn-on signal and ends when $i_c$ begins to rise. The second period $[t_1\text{-}t_2]$ starts when $i_c$ begins to rise from 0 and ends when $i_c$ reaches the maximum value. The third period $[t_2\text{-}t_3]$ starts when $i_c$ reaches the maximum value and ends when $i_c$ falls back to the load current. The fourth period $[t_3\text{-}t_4]$ ends when $v_{ce}$ falls back to the saturation voltage. $[t_4\text{-}t_5]$ indicates the steady on-state of the IGBT.

Figure 2:
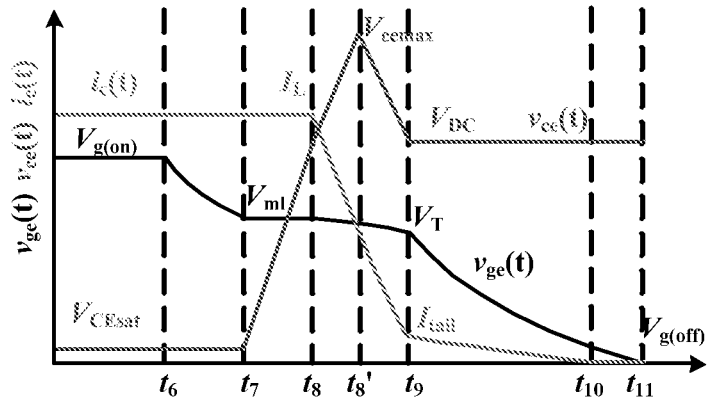
FIG. 2 is a piece-wise line model of IGBT during the switching-off transient according to at least one embodiment of the present invention.

In FIG. 2, the switching-off transient, which is after a turn-off signal and before a steady off-state, is divided into four periods. The first period $[t_6\text{-}t_7]$ starts when the gate drive sends the turn-off signal and ends when $v_{ce}$ begins to rise. The second period $[t_7\text{-}t_8]$ starts when $v_{ce}$ begins to rise from the saturation voltage and ends when $v_{ce}$ reaches the DC bus voltage. The third period $[t_8\text{-}t_9]$ starts when $i_c$ begins to fall from the load current and ends when $i_c$ falls to a tail current initial value. The fourth period $[t_9\text{-}t_{10}]$ ends when $i_c$ falls to 0. $[t_{10}\text{-}t_{11}]$ indicates the steady off-state of the IGBT.

The modeling method further includes creating piece-wise line models for IGBT switching-on and switching-off transients.

The following description is for creating the piece-wise line model for IGBT switching-on transient.

During the switching-on transient, the DC bus voltage is defined as $V_{DC}$ and the load current is defined as $I_L$.

The various periods of the switching-on transient process of IGBT and the piece-wise line model are in FIG. 1.

Period I $[t_0\text{-}t_1]$: $t_0$ is defined as the time when the IGBT gate drive sends a turn-on signal, the output voltage of the gate drive changes from negative $V_{g(off)}$ to positive $V_{g(on)}$, and the IGBT driver charges the gate-to-emitter capacitor $C_{ge}$ through the gate resistor $R_{gon}$. During this period, the gate-emitter voltage $v_{ge}$, collector-emitter voltage $v_{ce}$ and collector current $i_c$ can be expressed by the following equations:

$$v_{ge}(t) = V_{g(on)} + (V_{g(off)} - V_{g(on)})\exp\left(-\frac{t - t_0}{R_{gon}C_{ge}}\right) \quad (1)$$

$$v_{ce}(t) = V_{DC} \quad (2)$$

$$i_c(t) = 0 \quad (3)$$

where $V_{g(off)}$ and $V_{g(on)}$ are off-state voltage and on-state voltage of the gate drive. $R_{gon}$ is the turn-on resistance of the gate drive. $C_{ge}$ is the gate-emitter capacitance of IGBT.

$t_1$ is defined as the time when $v_{ge}$ reaches the gate threshold voltage $V_T$.

$$t_1 - t_0 = R_{gon}C_{ge}\ln\left(\frac{V_{g(on)} - V_{g(off)}}{V_{g(on)} - V_T}\right) \quad (4)$$

All the parameters above can be obtained from the IGBT datasheet and the gate drive datasheet.

Period II $[t_1\text{-}t_2]$: From $t_1$, $v_{ge}$ keeps increasing from threshold voltage $V_T$. $t_2$ is defined as the time when the collector current $i_c$ increases to the peak current $I_{cmax}$. The peak current $I_{cmax}$ is regarded as being proportional to $I_L$, as expressed by the following equation:

$$I_{cmax} = \left(1 + \frac{I_{rr}}{I_N}\right)I_L \quad (5)$$

where $I_N$ is the rated current of the IGBT and $I_{rr}$ is the reverse recovery current of the diode under the rated current.

During this period, IGBT gate-emitter voltage $v_{ge}$ increases to miller-stage $V_{ml}$ linearly. The collector current $i_c$ rises to the maximum value $I_{cmax}$ at the same slope as in the rated condition. The collector-emitter voltage $v_{ce}$ falls at a constant slope. The gate-emitter voltage $v_{ge}$, the collector-emitter voltage $v_{ce}$ and the collector current $i_c$ can be expressed by the following equations:

$$i_c(t) = i_c(t_1) + k_{i2}(t - t_1) \tag{6}$$

$$v_{ce}(t) = v_{ce}(t_1) + k_{v2}(t - t_1) \tag{7}$$

$$v_{ge}(t) = v_{ge}(t_1) + k_{vg2}(t - t_1) \tag{8}$$

where $$k_{i2} = \frac{I_N + I_{rr}}{t_r/0.8 + t_{rr}/2} \tag{9}$$

$$k_{v2} = \frac{-L_s k_{i2}}{t_r/0.8} \tag{10}$$

$$k_{vg2} = \frac{(V_{ml} - V_T) k_{i2}}{(1 + I_{rr}/I_N) I_L} \tag{11}$$

where $t_r$ is the turn-on rise time of the IGBT, $t_{rr}$ is the reverse recovery time of the diode. $V_{ml}$ is the miller-stage voltage, which can be obtained from the curve of the gate charge characteristics. $L_s$ is the stray inductance.

All the parameters above can be obtained from the IGBT datasheet.

The duration of this period is expressed by the following equation.

$$t_2 - t_1 = \frac{I_L(1 + I_{rr}/I_N)}{k_{i2}} \tag{12}$$

Period III [$t_2$-$t_3$]: After $t_2$, the collector current $i_c$ keeps falling from the peak value until it reaches the load current $I_L$ at $t_3$. During this period, $v_{ge}$ keeps unchanged. $v_{ce}$ will fall to the saturation voltage $V_{CEsat}$ after $2t_{rr}$ from $t_3$. The rate of change of the collector current $i_c$ is contrary to the previous period, as expressed by the following equations:

$$i_c(t) = i_c(t_2) + k_{i3}(t - t_2) \tag{13}$$

$$v_{ce}(t) = v_{ce}(t_2) + k_{v3}(t - t_2) \tag{14}$$

$$v_{ge}(t) = V_{ml} \tag{15}$$

where $$k_{i3} = -k_{i2} \tag{16}$$

$$k_{v3} = \frac{V_{CEsat} - v_{ce}(t_2)}{-I_L I_{rr}/I_N k_{i3} + 2 t_{rr}} \tag{17}$$

Where $V_{CEsat}$ is the saturation voltage under the corresponding collector current according to the IGBT datasheet, which can be directly obtained from a look-up table of output characteristics or calculated by a curve-fitting method.

The duration of this period is expressed by the following equation.

$$t_3 - t_2 = -\frac{I_L I_{rr}}{I_N k_{i3}} \tag{18}$$

Period IV [$t_3$-$t_4$]: $v_{ce}$ keeps falling after $t_3$ and reaches $V_{CEsat}$ at $t_4$. During this period, the IGBT gate-emitter voltage $v_{ge}$ and the collector current $i_c$ keep unchanged, as expressed by the following equations.

$$i_c(t) = I_L \tag{19}$$

$$v_{ce}(t) = v_{ce}(t_2) + k_{v3}(t - t_2) \tag{20}$$

$$v_{ge}(t) = V_{ml} \tag{21}$$

The duration of this period is expressed by the following equation.

$$t_4 - t_3 = 2 t_{rr} \tag{22}$$

Steady on-state [$t_4$-$t_5$]: From $t_4$, $v_{ge}$ is further charged to the on-state voltage of the gate drive $V_{g(on)}$ by the RC circuit. $v_{ce}$ and $i_c$ keep unchanged during this period.

$$v_{ge}(t) = V_{g(on)} + (V_{ml} - V_{g(on)}) \exp\left(-\frac{t - t_4}{R_{gon}(C_{ge} + C_{oxd})}\right) \tag{23}$$

$$i_c(t) = I_L \tag{24}$$

$$v_{ce}(t) = V_{CEsat} \tag{25}$$

The capacitance $C_{ge} + C_{oxd}$ equals to the value of the input capacitance $C_{ies}$ when $v_{ce}$ is the saturation voltage, which can be obtained from the capacitances-voltage curve provided by the IGBT datasheet.

This period represents the steady on-state. This period lasts until the next turn-off time $t_5$.

The following description relates to creating the piece-wise line model for IGBT switching-off transient.

The various periods of the switching-off transient process of IGBT and the piece-wise line model are in FIG. 2.

Period I [$t_6$-$t_7$]: $t_6$ is defined as the time when the IGBT gate drive sends a turn-off signal, the output voltage of the IGBT gate drive changes from positive $V_{g(on)}$ to negative $V_{g(off)}$, and the IGBT driver discharges the gate-to-emitter capacitor $C_{ge}$ through the gate resistor $R_{goff}$. During this period, the gate-emitter voltage $v_{ge}$, the collector-emitter voltage $v_{ce}$ and the collector current $i_c$ can be expressed by the following equations.

$$v_{ge}(t) = V_{g(off)} + (V_{g(on)} - V_{g(off)}) \exp\left(-\frac{t - t_6}{R_{goff}(C_{ge} + V_{oxd})}\right) \tag{26}$$

$$i_c(t) = I_L \tag{27}$$

$$v_{ce}(t) = V_{CEsat} \tag{28}$$

$t_7$ is defined as the time when $v_{ge}$ falls to the miller-stage voltage $V_{ml}$. The duration of this period is expressed as $$t_7 - t_6 = R_{goff}(C_{ge} + C_{oxd}) \ln\left(\frac{V_{g(on)} - V_{g(off)}}{V_{ml} - V_{g(off)}}\right) \tag{29}$$

Period II [$t_7$-$t_8$]: From $t_7$, the collector-emitter voltage $v_{ce}$ begins to rise until it reaches the DC bus voltage $V_{DC}$ at $t_8$.

The duration of this period is expressed as:

$$t_8 - t_7 = t_{doff} - R_{goff}(C_{ge} + C_{oxd})\ln\left(\frac{V_{g(on)} - V_{g(off)}}{V_{ml} - V_{g(off)}}\right) \quad (30)$$

$t_{doff}$ is the IGBT turn-off delay time, which is provided by the IGBT datasheet.

During this period, the gate-emitter voltage $v_{ge}$, the collector-emitter voltage v and the collector current $i_c$ can be expressed by the following equations $$v_{ge}(t) = V_{ml} \quad (31)$$

$$i_c(t) = I_L \quad (32)$$

$$v_{ce}(t) = v_{ce}(t_7) + k_{v8}(t - t_7) \quad (33)$$

where $$k_{v8} = \frac{V_{DC} - V_{CEsat}}{t_8 - t_7} \quad (34)$$

Period III [$t_8$-$t_9$]: From $t_8$, $i_c$ begins to fall until it reaches a tail current initial value $I_{tail}$ at $t_9$. The tail current initial value $I_{tail}$ is proportional to the load current $I_L$.

$$I_{tail} = 0.2 I_L \quad (35)$$

During this period, the gate-emitter voltage $v_{ge}$ and the collector current $i_c$ can be expressed by the following equations:

$$v_{ge}(t) = v_{ge}(t_8) + k_{vg9}(t - t_8) \quad (36)$$

$$i_c(t) = i_c(t_8) + k_{i9}(t - t_8) \quad (37)$$

where $$k_{vg9} = \frac{V_T - V_{ml}}{t_f / 0.8} \quad (38)$$

$$k_{i9} = \frac{I_{tail} - I_L}{t_f / 0.8} \quad (39)$$

$t_f$ is the turn-off fall time of the IGBT, provided by the IGBT datasheet.

The duration of this period is expressed as:

$$t_9 - t_8 = \frac{t_f}{0.8} \quad (40)$$

In this period, the IGBT collector-emitter voltage $v_{ce}$ waveform is approximately an isosceles triangle. The time $t_8'$ is defined as $$t_8' = t_8 + t_f / 1.6 \quad (41)$$

$v_{ce}$ can be expressed by the following equation:

$$v_{ce}(t) = \begin{cases} v_{ce}(t_8) + k_{v9}(t - t_8) & t_8 < t < t_8' \\ v_{ce}(t_8') - k_{v9}(t - t_8') & t_8' < t < t_9 \end{cases} \quad (42)$$

where $$k_{v9} = \frac{2(V_{ce\,max} - V_{DC})}{t_f / 0.8} \quad (43)$$

The voltage peak $V_{cemax}$ during this period is caused by the stray inductance, and can be approximately expressed as:

$$V_{cemax} = V_{DC} + 0.8 L_s \frac{I_L - I_{tail}}{t_f} \quad (44)$$

Period IV [$t_9$-$t_{10}$]: At $t_9$, $v_{ge}$ falls to $V_T$. $t_{10}$ is defined as the time when the collector current falls to 0. During this period, the gate-emitter capacitor is further discharged by the gate drive through the turn-off gate resistor $R_{goff}$.

The duration of this period is expressed as:

$$t_{10} - t_9 = 10 t_f \quad (45)$$

During this period, the gate-emitter voltage $v_{ge}$, the collector-emitter voltage $v_{ce}$ and the collector current $i_c$ can be expressed by the following equations.

$$v_{ge}(t) = V_{g(on)} + (V_{g(off)} - V_{g(on)})\exp\left(-\frac{t - t_0}{R_{gon} C_{ge}}\right) \quad (46)$$

$$v_{ce}(t) = V_{DC} \quad (47)$$

$$i_c(t) = i_c(t_9) + k_{i10}(t - t_9) \quad (48)$$

where $$k_{i10} = \frac{-I_{tail}}{10 t_f} \quad (49)$$

Steady off-state [$t_{10}$-$t_{11}$]: During this period, the gate-emitter voltage $v_{ge}$, the collector-emitter voltage $v_{ce}$ and the collector current $i_c$ can be expressed by the following equations.

$$v_{ge}(t) = V_{g(on)} + (V_{g(off)} - V_{g(on)})\exp\left(-\frac{t - t_0}{R_{gon} C_{ge}}\right) \quad (50)$$

$$v_{ce}(t) = V_{DC} \quad (51)$$

$$i_c(t) = i_c(t_9) + k_{i10}(t - t_9) \quad (52)$$

This period represents the steady off-state. The period lasts until the next turn-on time $t_{11}$.

The IGBT piece-wise line model of embodiments of the present invention is suitable for implementation in a simulation circuit. In an embodiment, the IGBT piece-wise line model is used to describe the characteristics of the whole commutation loop. There is no need to model the diode commutating with the IGBT.

Accordingly, the present invention provides a circuit simulation method.

Figure 3:
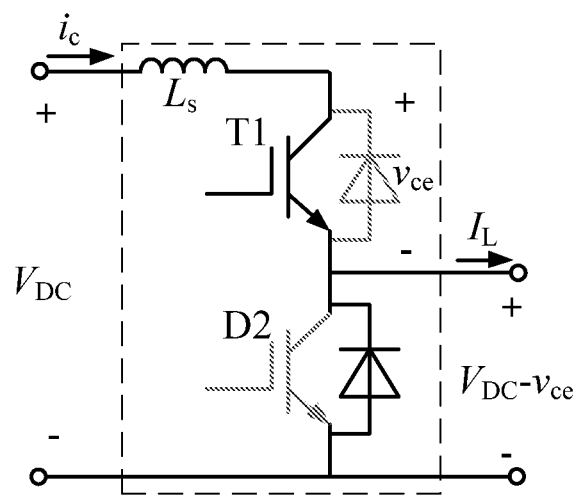
FIG. 3 illustrates an implementation of the piece-wise line model of IGBT in a simulation circuit when the current flows out of the phase arm according to at least one embodiment of the present invention.
Figure 4:
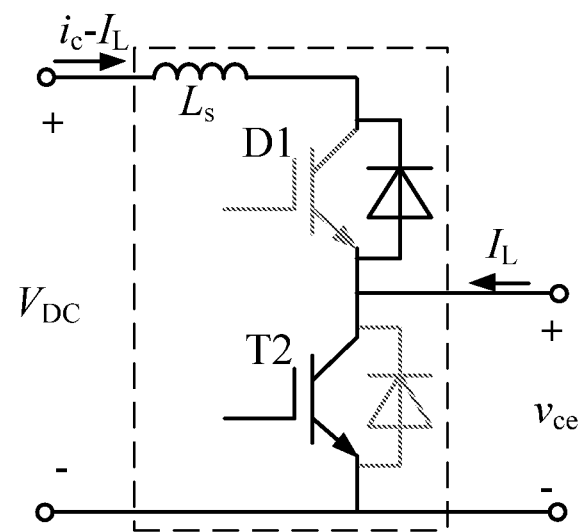
FIG. 4 illustrates an implementation of the piece-wise line model of IGBT in a simulation circuit when the current flows into the phase arm according to at least one embodiment of the present invention.

An IGBT, a commutation diode and stray inductance in a commutation loop are taken as a two-port network. Voltages and currents of the input and output ports of the two-port network are determined according to the direction of the output current. When the output current flows out of the phase arm (the two-port network), the voltage of the input port equals to the DC bus voltage $V_{DC}$ and the current of the input port equals to the collector current $i_c$, while the current of the output port equals to the load current $I_L$ and the voltage of the output port equals to $V_{DC}$-$v_{ce}$, $v_{ce}$ is the collector-emitter voltage, as shown in FIG. 3. When the current of the output port flows into the phase arm (the two-port network), the voltage of the input port equals to the DC bus voltage $V_{DC}$ and the current of the input port equals to $i_c$-$I_L$, while the current of the output port equals to the load current $I_L$ and the voltage of the output port equals to the collector-emitter voltage $v_{ce}$, as in FIG. 4.

The relationship between ($v_{ce}$, $i_c$) and ($V_{DC}$, $I_L$, sw) in each period during switching-on and switching-off transients is obtained according to the above modeling method of IGBT devices, wherein sw represents the IGBT switching signal.

The two-port network in its entirety is added to a simulation circuit for computation.

Figure 5:
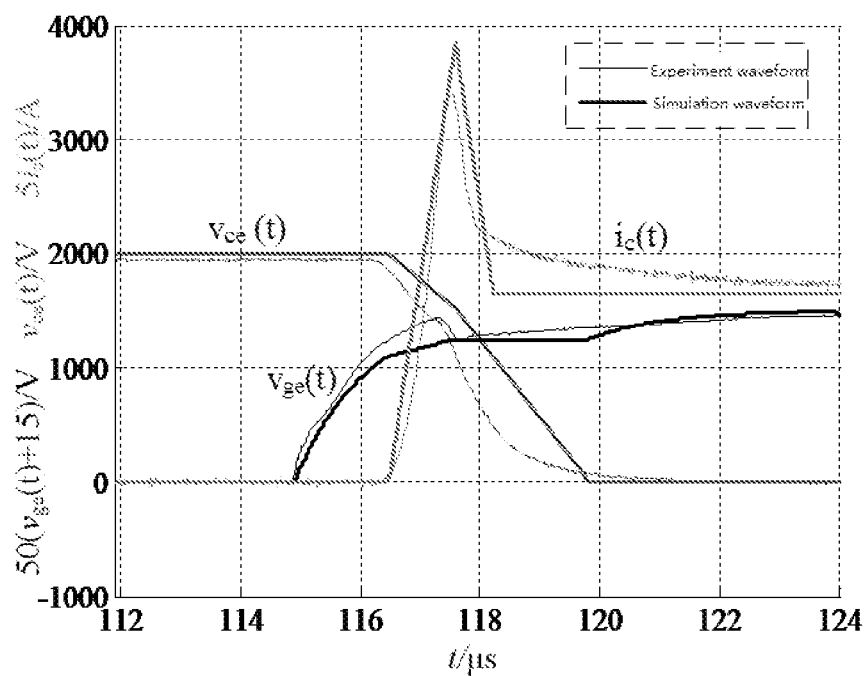
FIG. 5 is a graph of simulation results of the piece-wise line model of IGBT during switching-on transient according to at least one embodiment of the present invention and experiment waveforms.
Figure 6:
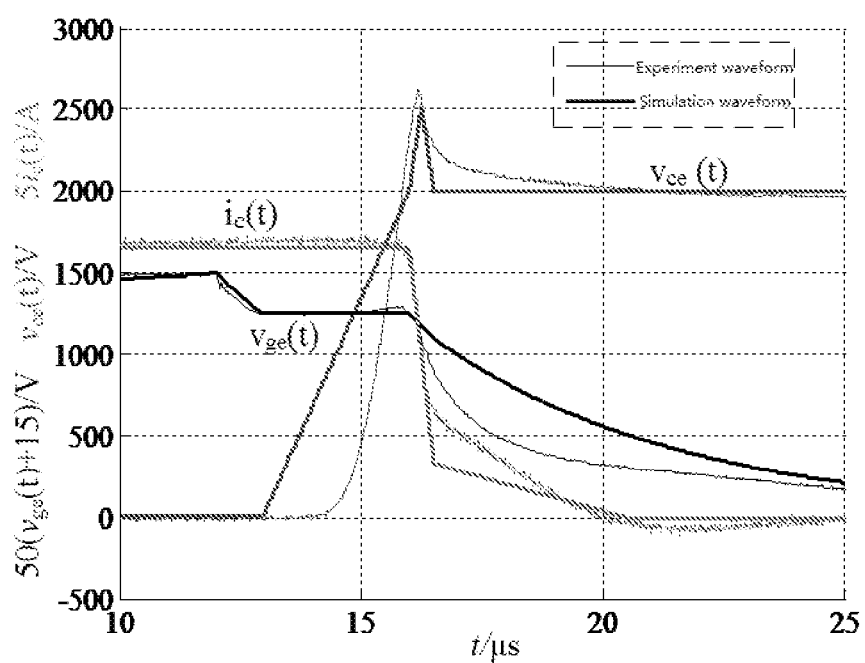
FIG. 6 is a graph of simulation results of the piece-wise line model of IGBT during switching-off transient according to at least one embodiment of the present invention and experiment waveforms.

According to the IGBT modeling method according to at least one embodiment of the present invention, a piece-wise line model of the 6500V/600 A FZ600R65KF1 IGBT is created and implemented in a double pulse test circuit. FIG. 5 is a graph of simulation results and experiment waveforms of the IGBT gate-emitter voltage $v_{ge}$, collector-emitter voltage $v_{ce}$ and collector current $i_c$ during switching-on transient. FIG. 6 is graph of simulation results and experiment waveforms of the IGBT gate-emitter voltage $v_{ge}$, collector-emitter voltage $v_{ce}$ and collector current $i_c$ during switching-off transient. As shown in the two figures, the piece-wise line model of the present invention can be applied in circuit simulation. The model is capable of accurately representing the major characteristics of the IGBT during transient process including the delay time, turn-on rise time, turn-off fall time, peak voltage, peak current, etc.

Embodiments of present invention include at least one of the following features.

Based on a typical IGBT internal structure (e.g. planar NPT IGBT) and transient processes of the IGBT, and under certain simplification assumptions, a piece-wise line model is created to describe the collector-emitter voltage $v_{ce}$ and collector current $i_c$ of IGBT during switching-on and switching-off transients.

The piece-wise line model can accurately represent the important transient characteristics of the IGBT including the delay time, turn-on rise time, turn-off fall time, peak voltage, peak current, etc.

All parameters of the model can be obtained from datasheets.

The model can be implemented conveniently in circuit simulation. There is no need to model the commutation diode in the commutation loop.

At least one embodiment of the present invention can also be implemented as a computer-readable storage medium. The computer-readable storage medium can store program instructions, which can be executed by one or more processors to perform the simulation method of the embodiment of the present invention. The computer-readable storage medium may include, e.g., magnetic or optical medium such as fixed or movable disks, magnetic tape, CD-ROM, DVD-ROM, CD-R, CD-RW, DVD-R, DVD-RW or Blue Ray disk. The computer-readable storage medium may include volatile or non-volatile storage medium, such as RAM, ROM, flash memory, USB memory, etc. The computer-readable storage medium may also include microelectromechanical system (MEMS), and storage medium accessible via communication media such as network or wireless link.

Embodiments of the present invention have been described in conjunction with the drawings. The above described embodiments are only illustrative but not intended to limit the scope of the present invention. Those skilled in the art may make various modifications, equivalent replacement and improvements without departing the spirit and principle of the present invention. The protection scope of the present invention are defined by the appended claims only.

What is claimed is:

1. An insulated gate bipolar transistor (IGBT) modeling method, comprising:
creating first piece-wise line functions describing a collector-emitter voltage $v_{ce}$, a collector current $i_c$ and a gate-emitter voltage $v_{ge}$ of the IGBT during a switching-on transient based on an internal structure of the IGBT and transient processes of the IGBT, wherein creating the first piece-wise line functions comprises:
determining various periods during the switching-on transient of the IGBT, wherein the switching-on transient, which is after receipt of a turn-on signal and before a steady on-state, is divided into four on periods: a first on period starts when a gate drive sends the turn-on signal and ends when $i_c$ begins to rise, a second on period starts when $i_c$ begins to rise from 0 and ends when $i_c$ reaches a maximum value, a third on period starts when $i_c$ reaches the maximum value and ends when $i_c$ falls back to a load current, and a fourth on period ends when $v_{ce}$ falls back to a saturation voltage; and
determining starting values and ending values of each of the collector-emitter voltage $v_{ce}$, the collector current $i_c$ and the gate-emitter voltage $v_{ge}$ during the four on periods of the switching-on transient and a duration of each of the first on period, the second on period, the third on period and the fourth on period based on the transient processes of the IGBT, thereby determining the collector-emitter voltage $v_{ce}$, the collector current $i_c$ and the gate-emitter voltage $v_{ge}$ during each of the first on period, the second on period, the third on period and the fourth on period as a linear function or an exponential function; and
creating second piece-wise line functions describing the collector-emitter voltage $v_{ce}$, the collector current $i_c$ and the gate-emitter voltage $v_{ge}$ of the IGBT during a switching-off transient based on the internal structure of the IGBT and the transient processes of the IGBT, wherein creating the second piece-wise line functions comprises:
determining various periods during the switching-off transient of the IGBT, wherein the switching-off transient, which is after receipt of a turn-off signal and before a steady off-state, is divided into four off periods: a first off period starts when the gate drive sends the turn-off signal and ends when $v_{ce}$ begins to rise, a second off period starts when $v_{ce}$ begins to rise from the saturation voltage and ends when $v_{ce}$ reaches a DC bus voltage, a third off period starts when $i_c$ begins to fall from the load current and ends when $i_c$ falls to a tail current initial value, and a fourth off period ends when $i_c$ falls to 0; and
determining starting values and ending values of each of the collector-emitter voltage $v_{ce}$, the collector current $i_c$ and the gate-emitter voltage $v_{ge}$ during the four off periods of the switching-off transient and a duration of each of the first off period, the second off period, the third off period and the fourth off period based on the transient processes of the IGBT, thereby determining the collector-emitter voltage $v_{ce}$, the collector current $i_c$ and the gate-emitter voltage $v_{ge}$ during each of the first off period, the second off period, the third off period and the fourth off period as a linear function or an exponential function.

2. The IGBT modeling method according to claim 1, wherein all the parameters used in the creating of the first piece-wise line functions and the creating of the second piece-wise line functions are obtained from datasheets of the IGBT.

3. The IGBT modeling method according to claim 1, wherein the IGBT modeling method is used for circuit simulation.

4. The IGBT modeling method according to claim 1, wherein the IGBT is a planar non-punch through (NPT) IGBT.

5. A circuit simulation method, in which an IGBT piece-wise line model is used to describe characteristics of a commutation loop, the method comprising:
 forming a two-port network based on an IGBT, a freewheel diode and stray inductance in a commutation loop, wherein voltages and currents of each of an input port and an output port of the two-port network is determined according to a direction of an output current:
  if the output current flows out of the two-port network, the voltage of the input port equals a direct current (DC) bus voltage $V_{DC}$ and the current of the input port equals the collector current $i_c$, while the current of the output port equals a load current $I_L$ and the voltage of the output port equals $V_{DC}-v_{ce}$, $v_{ce}$ is a collector-emitter voltage;
  if the output current flows into the two-port network, the voltage of the input port equals the DC bus voltage $V_{DC}$ and the current of the input port equals $i_c-I_L$, while the current of the output port equals the load current $I_L$ and the voltage of the output port equals the collector-emitter voltage $v_{ce}$;
 obtaining a relationship between ($v_{ce}$, $i_c$) and ($V_{DC}$, $I_L$, sw) in each period during a switching-on transient and a switching-off transient based on the IGBT piece-wise line model,
 wherein sw represents an IGBT switching signal, and the IGBT piece-wise line model is obtained by:
 creating first piece-wise line functions describing a collector-emitter voltage $v_{ce}$, a collector current $i_c$ and a gate-emitter voltage $v_{ge}$ of the IGBT during a switching-on transient based on an internal structure of the IGBT and transient processes of the IGBT, wherein creating the first piece-wise line functions comprises:
  determining various periods during the switching-on transient of the IGBT, wherein the switching-on transient, which is after receipt of a turn-on signal and before a steady on-state, is divided into four on periods: a first on period starts when a gate drive sends the turn-on signal and ends when $i_c$ begins to rise, a second on period starts when $i_c$ begins to rise from 0 and ends when $i_c$ reaches a maximum value, a third on period starts when $i_c$ reaches the maximum value and ends when $i_c$ falls back to a load current, and a fourth on period ends when $v_{ce}$ falls back to a saturation voltage; and
  determining starting values and ending values of each of the collector-emitter voltage $v_{ce}$, the collector current $i_c$ and the gate-emitter voltage $v_{ge}$ during the four on periods of the switching-on transient and a duration of each of the first on period, the second on period, the third on period and the fourth on period based on the transient processes of the IGBT, thereby determining the collector-emitter voltage $v_{ce}$, the collector current $i_c$ and the gate-emitter voltage $v_{ge}$ during each of the first on period, the second on period, the third on period and the fourth on period as a linear function or an exponential function, and
 creating second piece-wise line functions describing the collector-emitter voltage $v_{ce}$, the collector current $i_c$ and the gate-emitter voltage $v_{ge}$ of the IGBT during a switching-off transient based on the internal structure of the IGBT and the transient processes of the IGBT, wherein creating the second piece-wise line functions comprises:
  determining various periods during the switching-off transient of the IGBT, wherein the switching-off transient, which is after receipt of a turn-off signal and before a steady off-state, is divided into four off periods: a first off period starts when the gate drive sends the turn-off signal and ends when $v_{ce}$ begins to rise, a second off period starts when $v_{ce}$ begins to rise from the saturation voltage and ends when $v_{ce}$ reaches a DC bus voltage, a third off period starts when $i_c$ begins to fall from the load current and ends when $i_c$ falls to a tail current initial value, and a fourth off period ends when $i_c$ falls to 0; and
  determining starting values and ending values of each of the collector-emitter voltage $v_{ce}$, the collector current $i_c$ and the gate-emitter voltage $v_{ge}$ during the four off periods of the switching-off transient and a duration of each of the first off period, the second off period, the third off period and the fourth off period based on the transient processes of the IGBT, thereby determining the collector-emitter voltage $v_{ce}$, the collector current $i_c$ and the gate-emitter voltage $v_{ge}$ during each of the first off period, the second off period, the third off period and the fourth off period as a linear function or an exponential function; and
 adding the two-port network to a simulation circuit for computation.

6. The circuit simulation method according to claim 5, wherein all the parameters used in the creating of the first piece-wise line functions and the creating of the second piece-wise functions are obtained from datasheets of the IGBT.

7. The circuit simulation method according to claim 5, wherein the IGBT modeling method is used for circuit simulation.

8. The circuit simulation method according to claim 5, wherein the IGBT is a planar NPT IGBT.

9. The IGBT modeling method according to claim 1, wherein creating the first piece-wise line functions comprises determining the collector-emitter voltage $v_{ce}$, the collector current $i_c$ and the gate-emitter voltage $v_{ge}$ during each of the first on period, the second on period, the third on period and the fourth on period as a single linear function or as a single exponential function.

10. The IGBT modeling method according to claim 1, wherein creating the second piece-wise line functions comprises determining the collector current $i_c$ and the gate-emitter voltage $v_{ge}$ during each of the first off period, the second off period, the third off period and the fourth off period as a single linear function or as a single exponential function.

11. The circuit simulation method according to claim 5, wherein creating the first piece-wise line functions comprises determining the collector-emitter voltage $v_{ce}$, the collector current $i_c$ and the gate-emitter voltage $v_{ge}$ during each of the first on period, the second on period, the third on period and the fourth on period as a single linear function or as a single exponential function.

12. The circuit simulation method according to claim 5, wherein creating the second piece-wise line functions comprises determining the collector current $i_c$ and the gate-emitter voltage $v_{ge}$ during each of the first off period, the second off period, the third off period and the fourth off period as a single linear function or as a single exponential function.

* * * * *